(12) United States Patent
Wang

(10) Patent No.: US 6,865,662 B2
(45) Date of Patent: Mar. 8, 2005

(54) CONTROLLING VLIW INSTRUCTION OPERATIONS SUPPLY TO FUNCTIONAL UNITS USING SWITCHES BASED ON CONDITION HEAD FIELD

(75) Inventor: Yu-Min Wang, Tai-Chung (TW)

(73) Assignee: Faraday Technology Corp., Hsin-Chu (TW)

(*) Notice: Subject to any disclaimer, the term of this patent is extended or adjusted under 35 U.S.C. 154(b) by 399 days.

(21) Appl. No.: 10/064,713

(22) Filed: Aug. 8, 2002

(65) Prior Publication Data
US 2004/0030860 A1 Feb. 12, 2004

(51) Int. Cl.[7] ................................. G06F 9/38
(52) U.S. Cl. ..................... 712/24; 712/215; 712/226
(58) Field of Search .................... 712/24, 215, 226

(56) References Cited

U.S. PATENT DOCUMENTS

| | | | | |
|---|---|---|---|---|
| 5,941,984 A | * | 8/1999 | Mohri et al. | 712/218 |
| 5,996,070 A | * | 11/1999 | Yamada et al. | 712/236 |
| 6,154,828 A | * | 11/2000 | Macri et al. | 712/24 |
| 6,366,999 B1 | * | 4/2002 | Drabenstott et al. | 712/24 |
| 6,418,527 B1 | * | 7/2002 | Rozenshein et al. | 712/208 |
| 6,516,407 B1 | * | 2/2003 | Suga et al. | 712/226 |
| 2003/0056088 A1 | * | 3/2003 | Heishi et al. | 712/214 |

* cited by examiner

Primary Examiner—Kenneth S. Kim
(74) Attorney, Agent, or Firm—Winston Hsu

(57) ABSTRACT

A VLIW processor for executing a sequence of very long instruction words having a plurality of operations to be executed in parallel. The VLIW processor has a plurality of functional units for parallel execution of the operations specified by the VLIW, an instruction register for holding the VLIW, and a condition flag for indicating the results of a comparison operation. The VLIW includes a conditional head and a plurality of slots, each slot including an operational code and any related operands. The conditional head has a plurality of conditional indicators, each conditional indicator uniquely corresponding to one operation and specifying a condition in which the operation is to be executed if the indicated condition exists. A control circuit is connected to the instruction register and the functional units to deliver the operation from the instruction register to the corresponding functional unit for execution when the condition exists.

13 Claims, 4 Drawing Sheets

```
12  If (a > 0)
        {
14       a = a + 1;
16       b = 3;
18       c = c - 4;
        }
    else
        {
20       a = a + 5;
22       b = b << 2;
24       c = c >> 3;
        }
```

Fig. 1 Prior art

```
32      CMPGT R0, 0;
34      JUMP.NC false;
36      ADD R1, R1, 0x1 || MVI R2, 0x3;
38      SUB R3, R3, 0x4;
40      JUMP exit;
42 false:
44      ADD R1, R1, 0x5 || LSL R2, 0x2;
46      LSR R3, 0x3;
48 exit:
```

Fig. 2 Prior art

```
60    CMPGT R0, 0;
62    CEX.C.C.NC.NC || ADD R1, R1, 0x1 ||
      MVI R2, 0x3 || ADD R1, R1, 0x5 || LSL R2, 0x2;
64    CEX.C.NC || SUB R3, R3, 0x4 || LSR R3, 0x3;
```

Fig. 3

CONTROLLING VLIW INSTRUCTION OPERATIONS SUPPLY TO FUNCTIONAL UNITS USING SWITCHES BASED ON CONDITION HEAD FIELD

BACKGROUND OF INVENTION

1. Field of the Invention

The present invention relates to very long instruction word (VLIW) processors and more particularly to a method and apparatus for a conditional control head instruction for VLIW processors.

2. Description of the Prior Art

Increasing demand for computer-processing performance has been met, at least in part, with computers that are able to employ instruction level parallelism (ILP), meaning that the computer can execute a plurality of instructions simultaneously. A very long instruction word (VLIW) processor achieves this using very long instruction words. VLIW processors are employed in super-computers, mainframes, and many other applications where high-performance processing power is required.

Each VLIW comprises a plurality of fields, or "slots". Each slot is designed to comprise a single, basic instruction comprising an operational code (opcode) and any associated operands. The number of slots in the VLIW is typically machine architectural dependent and depends on the number of functional units (FU), such as arithmetic and logic units (ALU) and floating point unit(s) (FPU) in the machine. Each slot corresponds to a specific ALU or FPU. The ALU performs operations such as addition, subtraction, and multiplication of integers and bit-wise and other Boolean operations. The FPU performs floating-point operations and due to cost, only one is generally utilized in a CPU. When the VLIW is executed, the FUs execute the operation indicated by the opcode in the corresponding slot.

In a conventional VLIW processor, one VLIW is transferred from memory to a pipeline during each machine cycle. The use of instruction pipelining is well known in the art and proven extremely effective in increasing throughput when the executing program code merely comprises a series of instructions to be executed sequentially. Each stage in the pipeline performs a dedicated functional step related to the execution of the instruction, such as fetching a value of an operand from memory. During sequential execution, the next instruction to be executed is known and can be transferred to the pipeline one machine cycle after the current instruction was transferred. Therefore, even though each instruction may require several steps to complete, once the pipeline is full, one instruction can be completed with each machine cycle.

However, most program code also comprises conditional instructions, for example an "if" statement, where it is unknown which specific instruction is to be executed next until after the conditional instruction has been completed. Because the next instruction to be executed is unknown, it is difficult or impossible to keep the pipeline full of sequentially required instructions, resulting in each conditional instruction slowing throughput.

Please refer to FIG. 1 of a sample program segment with a conditional "if" statement 12 written in the C programming language. FIG. 2 illustrates how a conventional VLIW compiler may generate the assembly code for the program segment in FIG. 1. Note the use of multiple slots in lines 36 and 44 where a double vertical line indicates a slot boundary.

In FIG. 2, it is not known if the flow of execution is to be lines 32->34->36->38->40->48 or lines 32->34->42->44->46->48 until after the expression (CMPGT R0, 0) in line 32 has been evaluated. If the condition (CMPGT R0, 0) is true, one set of instructions is needed. If the condition (CMPGT R0, 0) is false, a different set of instructions is needed. This ambiguity is known as a "branch delay" problem and the delay results from possibly having to flush the pipeline and wait for the transfer of the next correct instruction to the pipeline after the instruction in line 12 has been completed, a very undesirable result in high-performance processors.

Different approaches to the branch delay problem have been advanced. One common method is to attempt to predict the most likely instruction to be needed following a conditional statement based on the history of execution of a particular program. For example, if "R0" has always been greater than "0" before, "R0" will be greater than "0" is predicted when line 34 is encountered during program execution. Based on this prediction, the instructions in lines 36, 38, 40, and 48 are loaded into the pipeline immediately after the instruction in line 34. If the prediction turns out correct, the branch delay problem has been circumvented. However, if the prediction turns out to be incorrect, the pipeline must be flushed to clear unwanted instructions and the correct instructions in lines 42, 44, 46, and 48 must be transferred to the flushed pipeline and time is wasted waiting for the correct instructions to work their way through the pipeline.

A second advanced approach to the branch delay problem loads all possible sequences of instructions, each sequence corresponding to one possible result of a conditional expression such as indicated in line 34. Thus, in this method, all of the instructions in lines 36–48 are transferred to the pipeline. Each operation in the VLIW comprises not only the opcode and related operands, but also a flag of one or more bits indicating the operation belongs to one specific possible program branch. In FIG. 2 for an example of this approach, the flag with each operation in the lines 36–40 may be equal to a "1", meaning branch "1", and the flag with each operation in the lines 42–46 may be set to "0". If the condition (CMPGT R0, 0) in line 32 turns out to be true, only the instructions in slots that have a flag equal to "1" will be executed. If the condition (CMPGT R0, 0) in line 32 turns out to be false, only the instructions in slots that have a flag equal to "0" will be executed. While this second approach helps to keep the pipeline full, it requires that each slot in each VLIW include extra room for the flag bits. The number of bits required depends on the number of program branches possible at any given time during program execution.

Therefore, the prior art still lacks a solution to the branch delay problem. The predictive approach works sporadically and the flag bits approach requires additional bits to be stored with each operation in each VLIW instruction, bloating program size.

SUMMARY OF INVENTION

It is therefore a primary objective of the claimed invention to reduce the number of short jumps in program execution to reduce branch delays in a very long instruction word (VLIW) processor.

It is another objective of the claimed invention to avoid increasing the number of bits required to store a specification of an operation in a slot of the VLIW while conditionally controlling execution of each operation.

It is another objective of the claimed invention to allow each instruction in a VLIW to be individually controlled.

Briefly summarized, the claimed invention discloses a device and method for conditionally delivering instructions enclosed in a VLIW to corresponding functional units according to the results of a prior comparison instruction.

The claimed invention includes a VLIW processor for executing a sequence of very long instruction words having a plurality of operations to be executed in parallel. The VLIW processor has a plurality of functional units for parallel execution of the operations specified by the VLIW, an instruction register for holding the VLIW, and a condition flag for indicating the results of a comparison operation. The VLIW includes a conditional head and a plurality of slots, each slot including an operational code and any related operands. The conditional head has a plurality of conditional indicators, bit flags, or bits, each conditional indicator uniquely corresponding to the operation within one of the slots and specifying a condition in which the corresponding operation is to be executed if the indicated condition exists.

A control circuit is connected to the instruction register and the functional units to deliver the operation from the instruction register to the corresponding functional unit for execution when the condition specified in the corresponding conditional indicator exists. In one example of the claimed invention, the condition indicating that the operation is to be executed exists when the corresponding conditional indicator and the condition flag are set to the same value.

Another example of the claimed invention discloses where the condition indicating that the operation is to be executed exists when the corresponding conditional indicator and a value other than the condition flag, possibly even user defined, are set to the same value. Such a system, by adjusting the value to be used for comparison to an appropriate value for use in selecting the individual operations to be executed, could be used for selecting only specific portions of a program code to be executed, for example, for allowing a single program to function in different, possibly restricted modes in different situations, or for any other purpose.

It is an advantage of the claimed invention that by allowing individually controlled conditional execution of the operations specified in the VLIW, the number of short jumps during program execution can be reduced, improving throughput.

These and other objectives of the claimed invention will no doubt become obvious to those of ordinary skill in the art after reading the following detailed description of the preferred embodiment, which is illustrated in the various figures and drawings.

BRIEF DESCRIPTION OF DRAWINGS

FIG. 1 is a sample program segment written in the C programming language according to the prior art.

FIG. 2 illustrates how a conventional very long instruction word compiler may generate the assembly code for the program segment in FIG. 1.

FIG. 3 illustrates how a very long instruction word compiler may generate the assembly code for the program segment in FIG. 1 according to the present invention.

DETAILED DESCRIPTION

Figure 4:
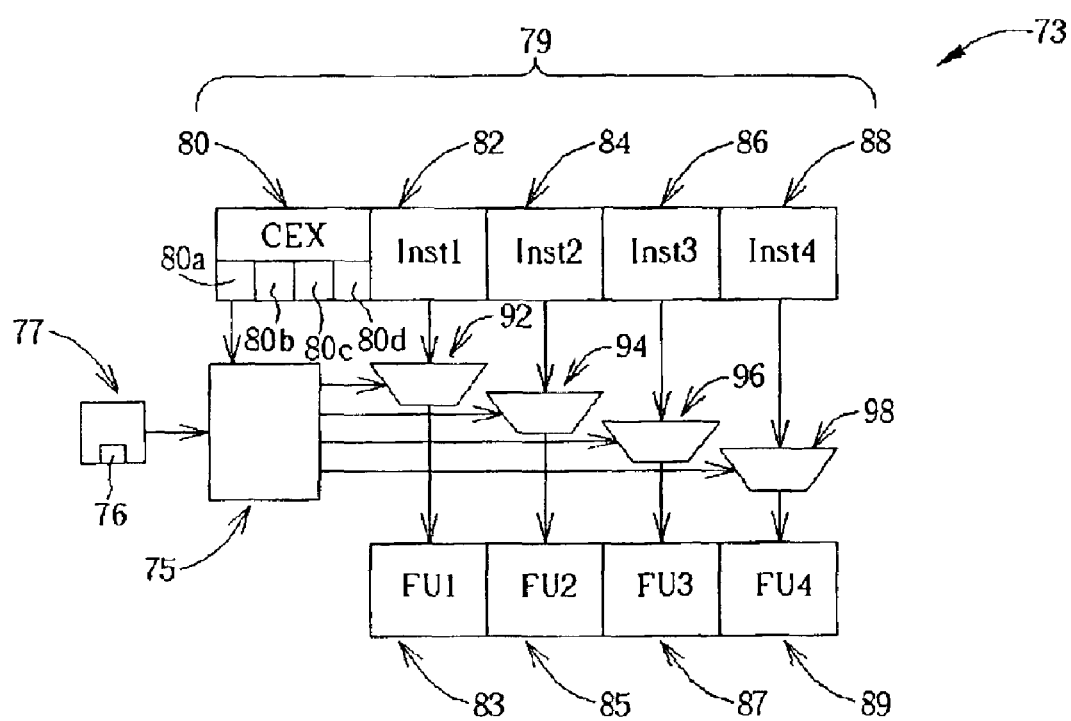
FIG. 4 illustrates the hardware implementation of the present invention.

Please refer to FIGS. 1–3. FIG. 1 is a sample program segment illustrating an "if" statement in the C programming language. FIG. 2 illustrates how a conventional very long instruction word (VLIW) compiler may generate the assembly code for the program segment in FIG. 1. FIG. 3 illustrates how a very long instruction word compiler may generate the assembly code for the program segment in FIG. 1 according to the present invention.

Lines 62 and 64 each correspond to a VLIW and comprise a plurality of fields, or slots separated by vertical double bars in the image. Each slot comprises a single operation including an operational code (opcode) and any related operands. Note that the jumps in lines 34 and 40 of FIG. 2 are not present in FIG. 3. Because jumps nearly always result in a branch delay, their absence in the code used by the present invention clearly improves throughput.

The present invention accomplishes the reduction in jumps through the use of a conditional execution head (CEX) shown in line 62 as "CEX.C.C.NC.NC". The ".C.C.NC.NC" extension of the CEX indicates conditions under which each of the four instructions included in the example VLIW of line 62 are to be executed. While four instructions are included in the example VLIW, the maximum number of instructions in one VLIW is usually hardware dependant and the present invention is not limited by the number of instructions in the VLIW.

The CEX instructions normally, but not necessarilly follow a comparison operation as shown in FIG. 60 where the value in R0 is compared with zero. As in prior art VLIW processors, when a comparison operation is performed, the results of the comparison are indicated in a flag register by setting a condition flag to "1" (meaning true) or "0" (meaning false).

When the VLIW shown in line 62 is loaded into an instruction register, each CEX conditional indicator (also known as a bit flag), a ".C" for example, directly corresponds to one of the slots and is compared with the condition flag. The conditional indicator ".C" means to execute the corresponding operation if and only if the condition flag is set to "1". An conditional indicator of ".NC" means to execute the corresponding operation if and only if the condition flag is set to "0". Thus, if the result of the comparison in line 60 is true and the condition flag is set to "1", a CEX.C.C.NC.NC conditional execution header indicates that the first and second operations specified in the VLIW are to be executed while the third and fourth specified operations are not to be executed. Consequently, using the conditional execution head of the present invention reduces the number of short jumps and keeps the pipeline full, improving throughput. Additionally, by using the conditional execution head, there is no need to increase the size of each instruction and bloating the code as is done in a prior art.

FIG. 4 illustrates the basic hardware of a VLIW processor according to the present invention. The VLIW processor 73 comprises an instruction register 79 for holding a VLIW. The VLIW comprises a conditional execution head (CEX) 80 and a plurality of slots 82, 84, 86, and 88, each holding an operation to be executed in parallel. The VLIW processor 73 further comprises a plurality of functional units (FU) 83, 85, 87, and 89 for executing the operations specified in the VLIW and a plurality of switches 92, 94, 96, and 98. Each switch 92, 94, 96, and 98 is uniquely disposed between the location of one slot 82, 84, 86, and 88 in the VLIW and the corresponding FU 83, 85, 87, and 89 for permitting or not permitting delivery of the specified operation from the slot 82, 84, 86, and 88 to the FU 83, 85, 87, and 89 as shown in FIG. 4. Also comprised by the VLIW processor 73 are a control circuit 75 for controlling the switches 92, 94, 96, and 98 and a flag register 77 comprising a condition flag 76 for holding the result of a comparison operation.

The switches 92, 94, 96, and 98 may be multiplexers, transistors, or any other device designed to controllably allow or halt the passage of an electrical signal and all such devices are intended to fall within the scope of the present invention. Additionally, the quantities of slots 82, 84, 86, and 88, FUs 83, 85, 87, and 89, and switches 92, 94, 96, and 98 are not limited by the present invention to being exactly four as disclosed in FIG. 4, but could be of any quantity. The exact quantity in any implementation of the present invention normally will depend on the number of FUs 83, 85, 87, and 89 comprised in the implementation.

A VLIW is loaded into the instruction register 79 for execution. The control circuit 75, possibly a multiplexer or a plurality of comparators or transistors, compares the condition flag 76 in the flag register 77 with each of the conditional indicators 80a, 80b, 80c, and 80d in the CEX 80. In this example, the conditional indicators 80a, 80b, 80c, and 80d respectively correspond to the operations located in slots 82, 84, 86, and 88 of the VLIW. If the condition flag 76 and one or more of the conditional indicators 80a, 80b, 80c, and 80d are set to the same value, each operation whose conditional indicator 80a, 80b, 80c, or 80d matches the condition flag 76 is to be executed.

Please refer to the CEX VLIW in line 62 of FIG. 3. Here, the conditional indicators are ".C.C.NC.NC" which can be translated into the bits "1100" and assume that the comparison operation in line 60 has set the condition flag 76 to "1". The control circuit 75 compares the condition flag 76 (a "1") with the conditional indicator 80a (a "C" which equals a "1"). Since the condition flag 76 is set to the same value as the conditional indicator 80a, the control circuit opens the corresponding switch 92 allowing delivery of the relevant operation from the slot 82 to the FU 83 for execution. Similarly, the control circuit compares the condition flag 76 with the remaining conditional indicators 80b, 80c, and 80d and controls the corresponding switches 94, 96, 98 based on the respective comparisons. Therefore, in this example, if the value in R0 is greater than zero (line 60), the operations in slots 82 and 84 are executed and the operations in slots 86 and 88 are not executed. Line 64 has an second CEX VLIW with the conditional indicators ".C.NC". Thus, in line 64, the operation in slot 82 is executed and the operation in slot 84 is not executed.

Another embodiment of the present invention functions similarly to the above description except that the conditional indicators 80a, 80b, 80c, and 80d are not matched to the condition flag 76 to indicate the desired execution of a specific operation. Instead, a different flag, register, or value, or even a combination of these, is used for comparison with the conditional indicators 80a, 80b, 80c, and 80d. Such a system, by adjusting the specific flag, register, or value appropriately, could be used for selecting only specific portions of a program code to be executed, for debugging, for allowing a single program to function in different, possibly restricted modes in different situations, or for any other purpose. Obviously, the control circuit of this embodiment would require the input of the flag, register, or value to be used for comparison with the conditional indicators 80a, 80b, 80c, and 80d.

In contrast to the prior art, the present invention can reduce the number of short jumps in program execution to reduce branch delays in a VLIW processor. The present invention achieves reducing the branch delays without requiring additional bits stored in each operation in a VLIW, avoiding bloating the program code. Additionally, the present invention provides for individual control over the execution of each operation. The reduction of branch delays caused by short jumps during program execution is an important factor in maximizing throughput in a high-performance VLIW processor and is facilitated by the present invention.

Those skilled in the art will readily observe that numerous modifications and alterations of the method and device may be made while retaining the teachings of the invention. For example, it is obvious that it does not have to be the condition flag that effectively selects the operations to be executed but could be any kind of indicator, a variable for example. This useful feature of the present invention is also lacking in the prior art and clearly further distinguishes itself from the prior art. Accordingly, the above disclosure should be construed as limited only by the metes and bounds of the appended claims.

What is claimed is:

1. A very long instruction word (VLIW) processor for executing a very long instruction word, the VLIW having a conditional execution head (CEX) and a plurality of operations, the VLIW processor comprising:

a plurality of functional units for executing operations in parallel;

an instruction register having a plurality of slots for holding the conditional execution head and the operations, the conditional execution head comprising a plurality of conditional indicators each specifying a condition under which a corresponding operation comprised in the VLIW is to be executed;

a plurality of switches each connected to a slot and a functional unit for controlling delivery of an operation from the slot to the functional unit for execution; and a control circuit connected to the instruction register and each switch, the control circuit being capable of opening or closing the switch according to the condition specified in the corresponding conditional indicator;

wherein functional units which are connected to opened switches will receive operations from slots connected to the switches, functional units which are connected to closed switches will be prohibited from receiving operations, and operations which are received by functional units will be executed in parallel.

2. The VLIW processor of claim 1 wherein each conditional indicator uniquely corresponds to only one operation comprised in the VLIW and each operation uniquely corresponds to only one conditional indicator comprised in the conditional execution head.

3. The VLIW processor of claim 1 wherein the operation comprises an operational code specifying the operation to be executed by the functional unit.

4. The VLIW processor of claim 1 further comprises a condition flag indicating the results of a comparison operation.

5. The VLIW processor of claim 4 wherein the conditional indicator is a single bit.

6. The VLIW processor of claim 5 wherein the condition to execute the operation is met when the conditional indicator and the condition flag are set to the same value.

7. A very long instruction word (VLIW) processor having a plurality of functional units for executing a very long instruction word, the VLIW comprising a conditional execution head (CEX) and a plurality of operations, the maximum number of operations to be executed being equal to the number of functional units, the VLIW processor comprising:

an instruction register having a plurality of slots for holding the conditional execution head and the operations, the conditional execution head comprising a plurality of conditional indicators, the number of conditional indicators being equal to the number of operations comprised in the VLIW and each conditional indicator uniquely corresponding to only one operation, each conditional indicator indicating a condition under which the corresponding operation is to be executed;

a plurality of switches for controlling the delivery of the operation from the instruction register to the functional unit, each switch connecting only one slot and only one functional unit in a one-to-one correspondence; and a control circuit connected to the instruction register and the switch, the control circuit capable of opening the switch when the condition indicating the corresponding operation is to be executed is met and for closing the switch when the condition indicating the corresponding operation is to be executed is not met.

8. The VLIW processor of claim 7 wherein the operation comprises an operational code specifying the operation to be executed by the functional unit.

9. The VLIW processor of claim 7 further comprises a condition flag indicating the results of a comparison operation.

10. The VLIW processor of claim 9 wherein the condition to execute the operation is met when the conditional indicator and the condition flag are set to the same value.

11. A method of program execution by a very long instruction word (VLIW) processor, the VLIW comprising a conditional execution head (CEX) and a plurality of operations, the conditional head comprising a plurality of conditional indicators, each conditional indicator corresponding to a predetermined operation and for specifying a condition when the operation is to be executed, the VLIW processor comprising an instruction register having a plurality of slots for holding the conditional execution head and the operations, a plurality of functional units for executing operations in parallel, and a plurality of switches, each switch in a one-to-one correspondence with and connected between only one slot and only one functional unit, the switch for controlling delivery of the operation to the functional unit, the method comprising:

opening the switch when the condition specified by the conditional indicator is met and closing the switch when the condition specified by the conditional indicator is not met.

12. The method of claim 11 wherein the VLIW processor further comprises a condition flag indicating the results of a comparison operation.

13. The method of claim 12 wherein the condition to execute the operation is met when the conditional indicator and the condition flag are set to the same value.

* * * * *